(12) United States Patent
Rios

(10) Patent No.: US 7,461,063 B1
(45) Date of Patent: Dec. 2, 2008

(54) UPDATING LOGISTIC REGRESSION MODELS USING COHERENT GRADIENT

(75) Inventor: Gordon P. Rios, Palo Alto, CA (US)

(73) Assignee: ProofPoint, Inc., Sunnyvale, CA (US)

( * ) Notice: Subject to any disclaimer, the term of this patent is extended or adjusted under 35 U.S.C. 154(b) by 450 days.

(21) Appl. No.: 10/855,693

(22) Filed: May 26, 2004

(51) Int. Cl.
*G06F 7/00* (2006.01)
(52) U.S. Cl. .................. 707/7; 707/101; 707/104.1
(58) Field of Classification Search .............. 707/104.1, 707/100, 10, 7, 101
See application file for complete search history.

(56) References Cited

U.S. PATENT DOCUMENTS

| | | | | |
|---|---|---|---|---|
| 6,751,614 | B1 * | 6/2004 | Rao | 707/5 |
| 6,901,398 | B1 * | 5/2005 | Horvitz et al. | 707/5 |
| 7,089,241 | B1 * | 8/2006 | Alspector et al. | 707/7 |
| 7,219,148 | B2 * | 5/2007 | Rounthwaite et al. | 709/224 |
| 7,249,162 | B2 * | 7/2007 | Rounthwaite et al. | 709/206 |
| 2003/0220860 | A1 * | 11/2003 | Heytens et al. | 705/35 |

OTHER PUBLICATIONS

Barber, David, "Learning from Data 1 Logistic Regression" [online], date unknown, [retrieved on or before Mar. 9, 2004]. Retrieved from the Internet: <URL: http://anc.ed.ac.uk/~dbarber/lfd1/lfd1_2003_log_reg.pdf>.
Komarek, Paul R. et al., "Fast Robust Logistic Regression for Large Sparse Datasets with Binary Outputs" [online], Jan. 3-6, 2003, Proceedings of the Ninth International Workshop on Artificial Intelligence and Statistics, [retrieved on or before Mar. 9, 2004]. Retrieved from the Internet: <URL: http://research.microsoft.com/conferences/AIStats2003/proceedings/papers.htm>.
Krishnapuram, Balaji et al., "Applying Logistic Regression and RVM to Achieve Accurate Probabilistic Cancer Diagnosis From Gene Expression Profiles" [online], Oct. 2002, GENSIPS: Workshop on Genomic Signal Processing and Statistics, [retrieved on or before Mar. 9, 2004]. Retrieved from the Internet: <URL: http://www.cs.duke.edu/~amink/publications/papers/hartemink02.gensips.pdf>.
Rennie, Jason, "Logistic Regression" [online] Apr. 23, 2003, Computer Science and Artificial Intelligence Laboratory, Massachusetts Institute of Technology, [retrieved on or before Mar. 9, 2004]. Retrieved from the Internet: <URL: http://people.csail.mit.edu/u/j/jrennie/public_htm/writing/lr.pdf>.
So, Ying, "A Tutorial on Logistic Regression," May 1993, 18th Annual Conference SUGI, SAS Institute Inc., pp. 1290-1295.
Whitehead, John, "An Introduction to Logistic Regression—Nuts and Bolts" [online], date unknown, [retrieved Mar. 9, 2004]. Retrieved from the Internet: <URL: http://personal.ecu.edu/whiteheadj/data/logit/intro.htm>.

(Continued)

*Primary Examiner*—Khanh B. Pham
*Assistant Examiner*—Leon J Harper
(74) *Attorney, Agent, or Firm*—Fenwick & West LLP

(57) ABSTRACT

A document classification system updates the logistic regression parameters of the logistic regression algorithm used to classify the documents, using a coherent gradient method based upon the coherency between the update data regarding the classifications of the documents and the combined data including both the update data and the original data used to generate the original logistic regression parameters. The classification system can be applied to an email filtering system for filtering spam email.

30 Claims, 4 Drawing Sheets

OTHER PUBLICATIONS

Diagram from "An Introduction to Logistic Regression" [online], date unknown, [retrieved Mar. 25, 2004]. Retrieved from the Internet: <URL: http://personal.ecu.edu/whiteheadj/data/logit/logit.gif>.

Whitehead, John, "An Introduction to Logistic Regression—Some Potential Problems and Solutions" [online], date unknown, [retrieved Mar. 9, 2004]. Retrieved from the Internet: <URL: http://personal.ecu.edu/whiteheadj/data/logit/problems.html>.

Whitehead, John, "An Introduction to Logistic Regression—Writing Up Results" [online], date unknown, [retrieved Mar. 9, 2004]. Retrieved from the Internet: <URL: http://personal.ecu.edu/whiteheadj/data/logit/writeup.htm>.

Whitehead, John, "An Introduction to Logistic Regression—Extensions to Other Logistic Techniques" [online], date unknown, [retrieved Mar. 9, 2004]. Retrieved from the Internet: <URL: http://personal.ecu.edu/whiteheadj/data.logit/extend.htm>.

Whitehead, John, "An Introduction to Logistic Regression—References" [online], date unknown, [retrieved Mar. 9, 2004]. Retrieved from the Internet: <URL: http://personal.ecu.edu/whiteheadj/data/logit/referenc.htm>.

Whitehead, John, "An Introduction to Logistic Regression—Hands on Application: Beginner" [online], date unknown, [retrieved Mar. 9, 2004]. Retrieved from the Internet: <URL: http://personal.ecu.edu/whiteheadj/data/logit/beginner.htm>.

Whitehead, John, "An Introduction to Logistic Regression—Hands on Application: Intermediate" [online], date unknown, [retrieved Mar. 9, 2004]. Retrieved from the Internet: <URL: http://personal.ecu.edu/whiteheadj/data/logit/intermed.htm>.

Whitehead, John, "An Introduction to Logistic Regression—Hands on Application: Advanced" [online], date unknown, [retrieved Mar. 9, 2004]. Retrieved from the Internet: <URL: http://personal.ecu.edu/whiteheadj/data/logit/advanced.htm>.

Whitehead, John, "An Introduction to Logistic Regression"—Power Point Presentation [online], date unknown, [retrieved Mar. 9, 2004]. Retrieved from the Internet: <URL: http://personal.ecu.edu/whiteheadj/data/logit/logitpap.htm>.

Brannick, Michael T., "Logistic Regression" [online], date unknown, [retrieved Jul. 14, 2004]. Retrieved from the Internet: <URL: http://luna.cas.usf.edu~mbrannic/files/regression/Logistic.html>.

\* cited by examiner

UPDATING LOGISTIC REGRESSION MODELS USING COHERENT GRADIENT

TECHNICAL FIELD

The present invention relates generally to the use of logistic regression for classification of documents, and more specifically, to updating logistic regression models using coherent gradients for classification models of documents, including but not limited to "spam" emails.

BACKGROUND OF THE INVENTION

Logistic regression is a type of a statistical classification method, and may be used to classify or filter documents such as "spam" or "junk" emails. In this application, logistic regression uses previous classifications of documents and the features in those documents to generate the models (parameters), and uses those models to predict the classification of new documents based upon a logistic regression function. For example, an email filtering system may develop logistic regression parameters based upon previous classifications ("spam" or "non-spam") of documents (e.g., test email or test data) input to the email filtering system, and use those parameters with a logistic regression algorithm to predict whether a new email input to the email filtering system is "spam" or "non-spam."

The problem of identifying spam email is unlike other classification problems, where the feature of the classes are generally constant and only need to be learned once. The characteristics of spam emails are continually evolving, as spammers attempt to defeat the filtering systems. Thus, any given set of features learned by any filtering system, including a logistic regression model, will eventually fail to usefully identify a spam email. Accordingly, it is desirable for a logistic regression model to be updated to reflect the new changing nature of the data that becomes available over time. However, conventional logistic regression algorithms do not ensure that the update to the logistic regression models actually enhances the accuracy of classification. Specifically, conventional logistic regression algorithms are not able to determine whether the updates to the logistic regression parameters suggested by the new classification data are coherent with the logistic regression models already in place. These existing logistic regression models were generated based upon the classifications of previous documents that still have significance to the filtering system, and thus should not be completely disregarded when updating the logistic regression parameters.

Therefore, there is a need for a method of updating logistic regression models based upon new classification data, in a manner that properly preserves the characteristics of the existing logistic regression models. There is also a need for ensuring that the updated logistic regression models enhance the accuracy of classification when used in email or document filtering systems. In addition, there is a need for determining whether the updates to the logistic regression parameters suggested by the new classification data are coherent with the logistic regression models already in place, for example, in the email filtering system.

SUMMARY OF THE INVENTION

A document classification system updates the logistic regression parameters of a logistic regression algorithm used to classify the documents using a coherent gradient method, based upon the combined data including both update data and the original data used to generate the logistic regression parameters, coherent with the update data regarding the classifications of the documents. In one embodiment, the update data may include documents that have been incorrectly classified, submitted directly by users of the system.

Generally, first and second gradients of the log likelihood of the combined data and the update data, respectively, are calculated. The updated logistic regression parameters are generated using selected elements of the first gradients that are coherent with the corresponding elements of the second gradients calculated for the update data associated with the same feature of the data, here the documents. In one embodiment, the first gradient is determined to be coherent with the corresponding second gradient, if the product of the first gradient and the corresponding second gradient is non-negative.

According to the coherent gradient method, the updates (changes) to the logistic regression parameters are made only when corresponding elements of the gradients of the log likelihoods of the combined data and the update data agree in sign or direction. Therefore, it is possible to avoid degradation of the performance of the logistic regression algorithm on data that are old yet still important or significant to the logistic regression algorithm and the document classification system.

The invention has application in any type of classification system in which the features of the data being classified are rapidly changing. Thus, the present invention has useful application in an email filtering system for filtering spam email, since the characteristics of spam messages are continually changing. Other useful applications include other document filtering systems, such as intelligence analysis, news filtering, compliance document filtering, and the like.

The features and advantages described in this summary and the following detailed description are not all-inclusive. Many additional features and advantages will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter.

The figures depict one embodiment of the present invention for purposes of illustration only. One skilled in the art will readily-recognize from the following discussion that alternative embodiments of the structures and methods illustrated herein may be employed without departing from the principles of the invention described herein.

DETAILED DESCRIPTION OF EMBODIMENTS

Figure 1:
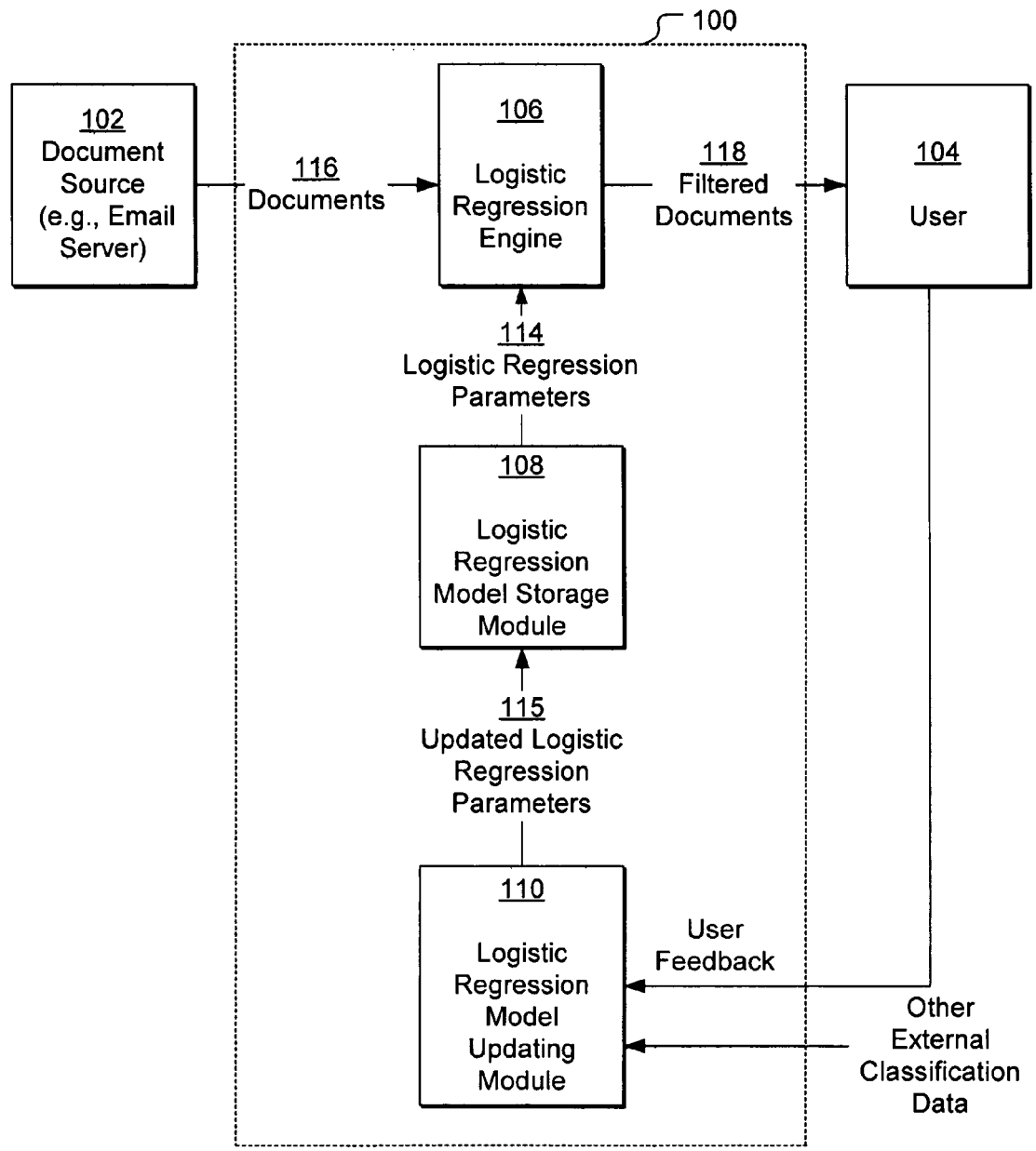
FIG. 1 is block diagram illustrating a document filtering system according to one embodiment of the present invention.

FIG. 1 is block diagram illustrating a document filtering system 100 according to one embodiment of the present invention. The document filtering system 100 includes a logistic regression engine 106, a logistic regression model storage module 108, and a logistic regression model updating module 110. The document filtering system 100 may be implemented in a computer including a processor and a computer readable storage medium such as a memory or a hard disk (not including intangible transmission media such as carrier waves) storing a computer program product including computer instructions configured to cause the processor to filter documents according to the embodiments of the present invention. The document filtering system 100 receives documents 116 from a document source 102, classifies the documents using a logistic regression algorithm and filters out certain types of documents, and outputs the filtered documents 118, for example, to a user 104. The documents provided by the document source 102 may be any type of documents provided from any source. For example, the documents source 102 may be an email server, and the documents 116 may be emails, in which case the document filtering system 100 may be a "spam" email filtering system.

Each document 116 includes a plurality features from which the document filtering system 100 will determine the classification of the document 116. The features may be both content-related features and attributes of the documents. Content-related features include text or phrases included in the documents, encoding values (e.g., HTML code) or other types of content contained in the documents themselves. Attributes are characteristics of the documents 116, such as the size of the documents, the author of the documents, the source of the documents (sender of emails), and intended recipient of the documents (recipient of the emails), whether the document has an attachment, and the like. Attributes may also be cumulative or derived over a set of documents, such as a particular document being the Nth document sent from a particular sender, a particular domain, or having a size exceeding an average size determined from the prior M messages. These and other features will be apparent to those of skill in the art of document classification, and the present invention is not limited to any particular features.

Thus, the documents may be represented by binary feature vectors indicating the existence (1) or non-existence (0) of certain features that characterize the documents. For example, a binary feature vector $X=\{x_i\}=\{1, 1, 0, 0\}$ may be derived from the document 116 indicating the existence (1) or nonexistence (0) of the corresponding features $x_i$, e.g., {"click hear," "ad," "unsubscribe," "c0uples Only," . . . } in the document 116.

The task of the document filtering system 100 is to compute the probability that such document 116 belongs to a particular classification, i.e., to compute the probability P (C|X), where X is the binary feature vector of the document and C is the classification (e.g., spam or non-spam) to be made. The document filtering system 100 uses the computed probability to determine whether the document 116 should be classified one way or the other. For example, the document filtering system 100 may determine that an email 116 is a "spam" email that should be deleted or filtered if the probability P exceeds 0.9. The document filtering system 100 may also merely quarantine an email 116 if the probability P not less than 0.5 but not more than 0.9, but allow the email 116 to pass through if the probability is less than 0.5. In one embodiment, the deletion or quarantining of the emails may be performed in a decision module (not shown) in the document filtering system.

The filtered documents are provided to the user, who may provide feedback on the classification of the documents to the logistic regression model updating model 110. Such feedback includes the accurate classification (e.g., spam or non-spam) of the filtered document 116 as indicated by the user upon his or her review of the document (email) 116. Since the user has personally determined the classification of these filtered documents, such feedback information provides more accurate data that may be used for updating the logistic regression parameters 114 of the document filtering system 100. Here, the feedback data may include any type of classification data provided from any source external to the document filtering system. The feedback data may be provided by a user or from any other source external to the document filtering system.

The logistic regression engine 106 classifies the documents 116 based upon a logistic regression algorithm. The logistic regression engine 106 applies the logistic regression algorithm to the binary feature vector X of the provided document 116 to compute the probability P of a classification of the document 116. In one embodiment, the probability P is approximated by the following logistic regression function:

$$P = \frac{1}{1 + e^{\sum_i x_i w_i + w_0}}$$

where $X=\{x_i\}$ is the binary feature vector indicating the existence or non-existence of the corresponding features of the document 116, $w_i$ are the logistic regression parameters corresponding to the elements $\{x_i\}$ of the feature vector X, and $w_0$ is the intercept.

Figure 2:
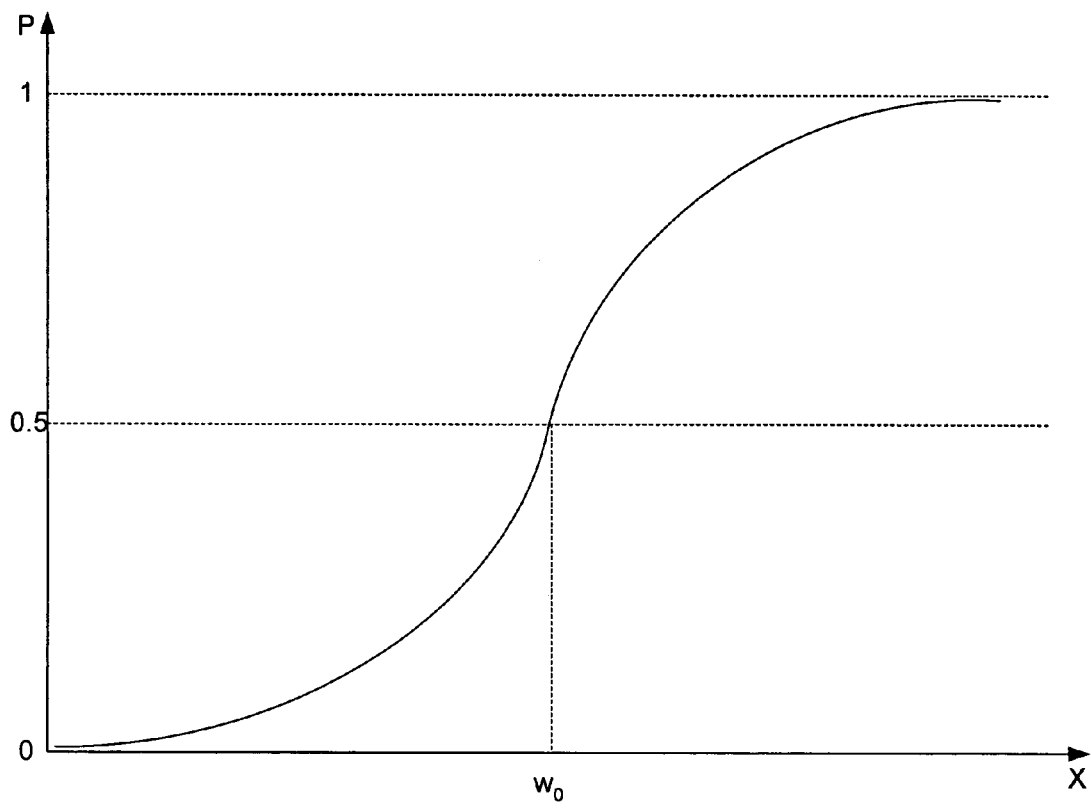
FIG. 2 is a graph illustrating an example of a logistic regression function used by the document filtering system of FIG. 1.

FIG. 2 is a graph illustrating an example of a logistic regression function used by the document filtering system 100 of FIG. 1. As shown in FIG. 2, the probability P is in a range between 0 and 1, and is 0.5 (50%) when the value of the feature vector X is equal to we. The logistic regression parameters $w_i$ determine the exact shape of the curve of the logistic regression function.

Referring back to FIG. 1, the logistic regression model storage module 108 stores the logistic regression parameters (models) $w_i$ and $w_0$ of the logistic function. These logistic regression parameters are initially derived based upon training documents or, the initial documents used to train the document filtering system 100. In one embodiment, the logistic regression parameters are stored in a hash table including the features of the documents and the corresponding logistic regression parameters, such as {"click here," "1.75}, {"ad," 1.567}, {"unsubscribe," "1.45"), {"c0uples Only," "1.66"}, . . . and $\{x_i, w_i\}$.

The logistic regression model updating module 110 receives the feedback on the filtered documents 118 from the user 104 and/or any other type of classification data from an external source, and generates updated logistic regression parameters 115 using a coherent gradient method according to the present invention. The updated logistic regression parameters 115 are stored in the logistic regression storage module 108 for further use in the logistic regression engine 106. Since the logistic regression engine 106 uses logistic regression parameters that reflect external classification data, the accuracy of the document filtering system 100 is significantly enhanced. The method of generating the updated logistic regression parameters 115 using the coherent gradient method will be explained in greater detail below.

In one embodiment, the logistic regression model updating module 110 updates the logistic regression parameters 115 in predetermined intervals. In another embodiment, the logistic regression model updating module 110 updates the logistic regression parameters 115 when the amount of update data reaches a predetermined number of records.

Figure 3:
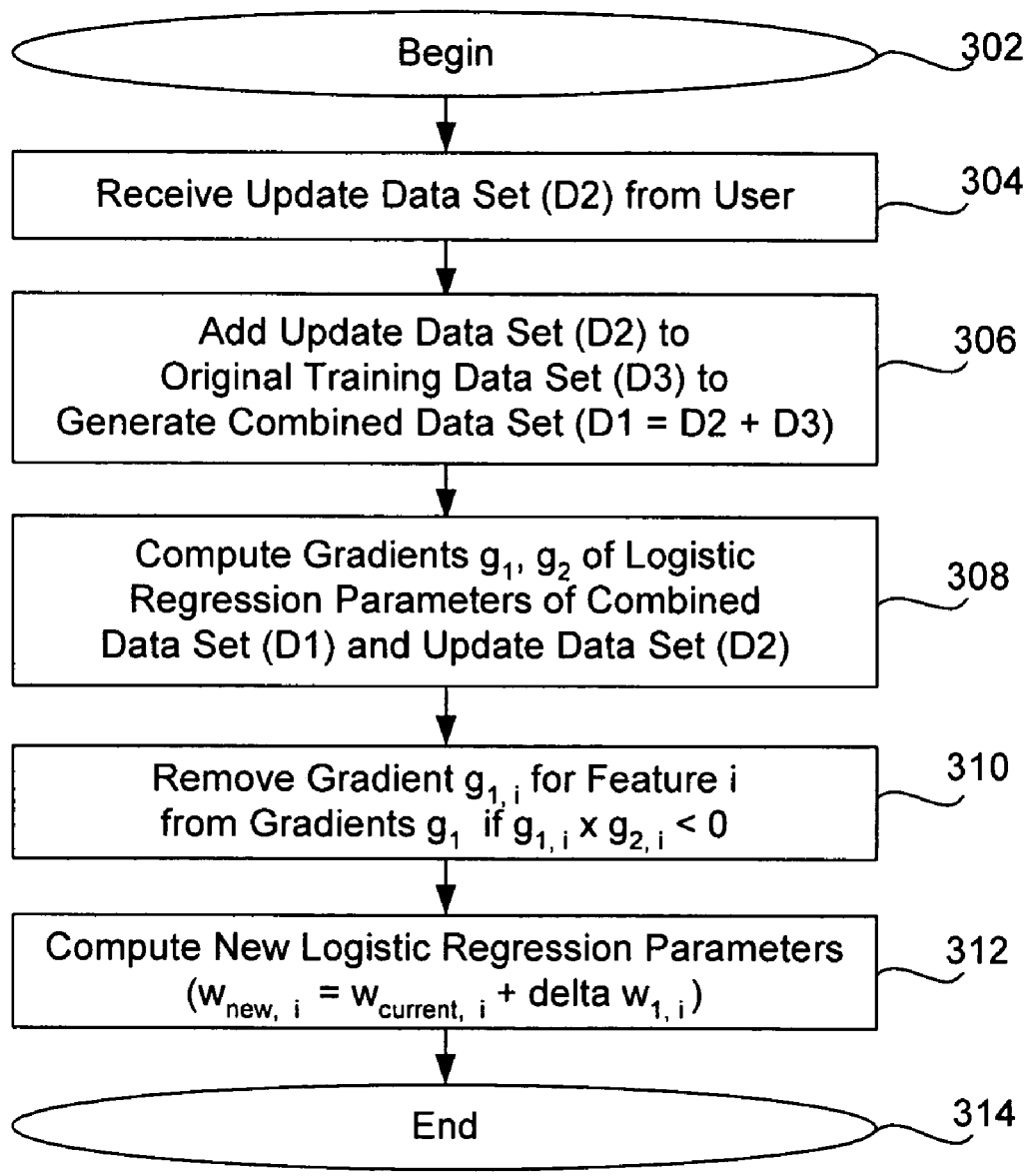
FIG. 3 is a flowchart illustrating a method of updating the logistic regression parameters of the logistic regression function, according to one embodiment of the present invention.

FIG. 3 is a flowchart illustrating a method of updating the logistic regression parameter, according to one embodiment of the present invention. As the process begins 302, the logistic regression model updating module 110 receives 304 an update data set (D2) from the user. The update data set (D2) includes the feedback provided by the user, indicating the classification (e.g., spam or non-spam) of the filtered documents 116 by the user 104 upon his or her review of the documents (emails) 116. The update data set (D2) may also include any other type of external classification data provided from a source external to the logistic regression algorithm. Specifically, the update data set (D2) is comprised of classifications ($y_j$=1 or 0) of the filtered documents j with the feature vectors $X_j=\{x_{ij}\}$ corresponding to the features i of the document j. The updated data set (D2) is added 306 to the original training data set (D3) from which the previous logistic regression parameters 114 were calculated, to generate 306 a combined data set D1 (D1=D2+D3).

The logistic regression model updating module 110 then computes 308 the gradients $g_1$, $g_2$ of the logistic regression parameters of the combined data set (D1) and the update data set (D2), respectively. The gradients $g_1$, $g_2$ are calculated based upon the log likelihood corresponding to each of the features of the logistic regression function.

Specifically, the likelihood function l is computed as follows:

$$l = \prod_j (P_j)^{y_j}(1-P_j)^{1-y_j},$$

where $P_j$ is the probability score of a particular classification (e.g., spam email) of document j, and $y_j$ is the classification (spam or non-spam in terms of 1 or 0) of the document j. As stated previously, the probability $P_j$ for document j is calculated as follows:

$$P_j = \frac{1}{1+e^{\sum_i x_{ij}w_i+w_0}},$$

where $X_j=\{x_{ij}\}$ is the binary feature vector indicating the existence or non-existence of the corresponding the features $\{x_i\}$ in the document j. The log likelihood function L is defined as the natural logarithm of the likelihood function l:

$$L = \ln l = \sum_j (y_j \ln P_j + (1-y_j)\ln(1-P_j))$$

The gradients $g_{1,i}$ and $g_{2,i}$ of the log likelihood of the combined data set (D1) and the update data set (D2), respectively, corresponding to feature i, are defined as:

$$g_{1,i} = \frac{\partial L_1}{\partial w_i}(=\Delta L_1) \text{ and } g_{2,i} = \frac{\partial L_2}{\partial w_i}(=\Delta L_2),$$

where $L_1$ and $L_2$ are the log likelihood of the combined data set (D1) and the update data set (D2), respectively.

Then, the logistic regression model updating module 110 removes 310 any gradient $g_{1,i}$ if the changes to the logistic regression models suggested by the gradients $g_{1,i}$ and $g_{2,i}$ are not coherent, i.e., if $g_{1,i} \cdot g_{2,i}<0$. That is, the gradients $g_{2,i}$ corresponding to the update data set (D2) are used to filter out certain incoherent gradients $g_{1,i}$ (changes to the logistic regression parameters) of the combined data set (D1).

The logistic regression model updating module 110 then computes 312 the updated logistic regression parameters $w_{new,i}$ corresponding to feature i by adding the changes (update) $\Delta w_{1,i}$ to the previous logistic regression parameters $w_i$, i.e., $w_{i,new}=w_i+\Delta w_{1,i}$. The change (update) $\Delta w_{1,i}$ to each of the logistic regression parameters is proportional to a function of the gradient $g_{1,i}$, of the combined data set (D1), i.e., $\Delta w_{1,i}=-\alpha f(g_{1,i})$ where $\alpha$ is a step size arrived at through the standard application of line maximization performed at every iteration of the optimization. In this embodiment, the function f applied to the gradient converts it to a conjugate gradient direction using standard methods from the field of mathematical optimization.

The method of updating logistic regression parameters using coherent gradient has the advantage that the changes to the logistic regression parameters are made only if the gradients corresponding to the combined data set (D1) (and thus including the previous data set (D3)) and the update data set (D2) agree in sign or direction. This means that logistic regression parameters will be updated only when the changes to the logistic regression parameters suggested by the feedback classification data introduced to the logistic regression algorithm is consistent with the changes to the logistic regression parameters as suggested by combined data set. This ensures that the changes to the logistic regression parameters suggested by the feedback classification data do not completely disregard the previous data set which may still have importance or significance to the logistic regression algorithm. Therefore, the method of the present invention helps avoiding degrading of the performance of the logistic regression engine 106 on data that are older yet still important or significant.

Figure 4:
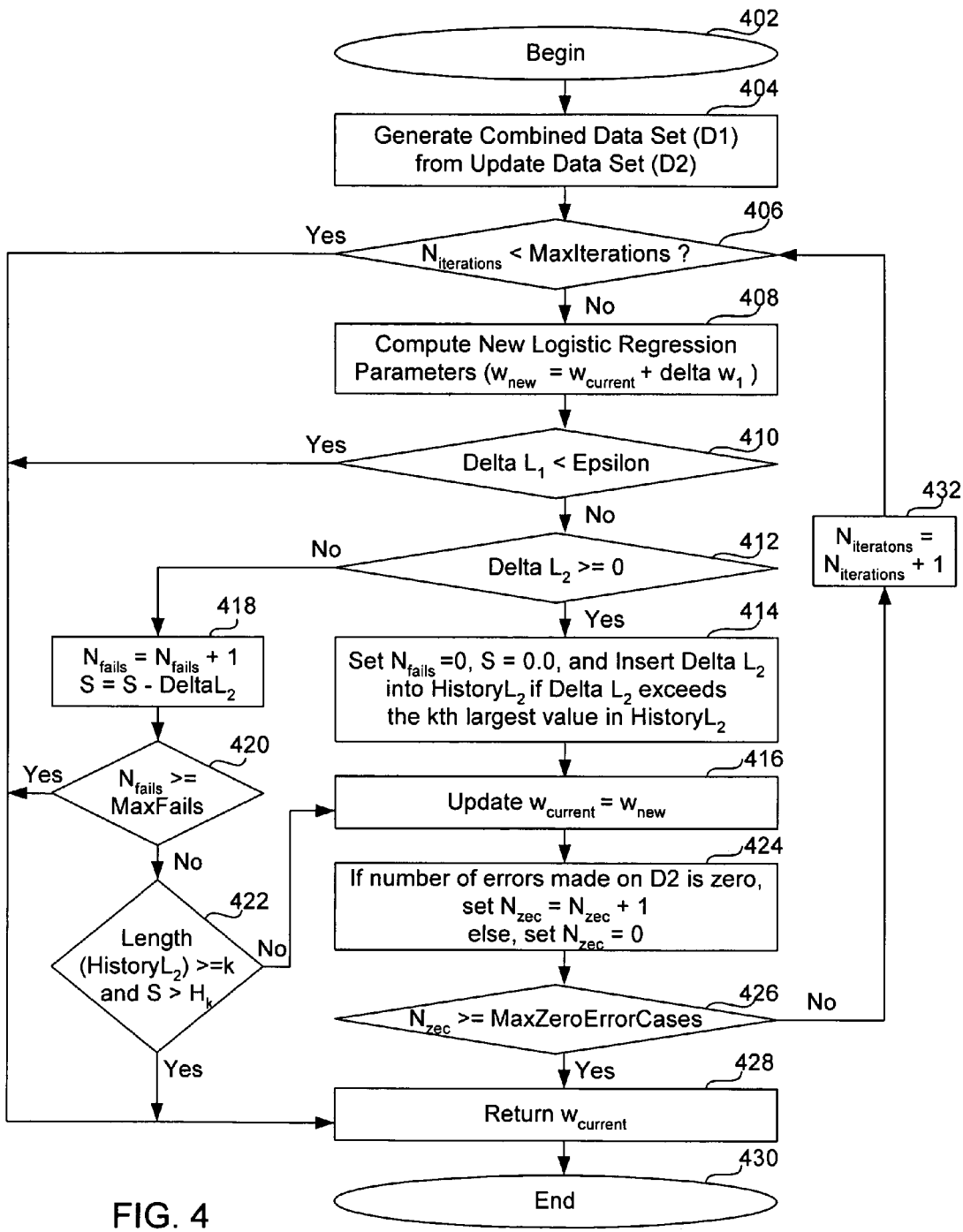
FIG. 4 is a flowchart illustrating a method of updating the logistic regression parameters of the logistic regression function, according to another embodiment of the present invention.

FIG. 4 is a flowchart illustrating a method of updating the logistic regression parameters, according to another embodiment of the present invention. In the embodiment of FIG. 4, several variables are defined and used, including:

MaxIterations: a predetermined maximum number of iterations in which updates to the logistic regression parameters are calculated based upon a given set of update data. In one embodiment, MaxIterations is set as 50 or 100;

$N_{iterations}$: a variable indicating the number of iterations in which updates to the logistic regression parameters are calculated based upon a given set of update data;

$\epsilon$ (Epsilon): a predetermined minimum improvement (in one embodiment, 0.001) that will be taken into consideration for updating the logistic regression parameters or any parameters generated through an iterative optimization process;

History$L_2$: a list of $\Delta L_2$ previously computed, i.e., a list of the biggest improvements made on the update data, in descending order;

$H_k$: kth largest value of $\Delta L_2$ stored in History$L_2$;

k: a predetermined number empirically derived, for example, 3 or 4 in one embodiment of the present invention;

$N_{fails}$: a variable indicating the number of failures (slippage, i.e., negative gradient suggested by the update data set);

MaxFails: a predetermined maximum number of failures (in one embodiment, 3) during which no improvement may be made in the update data;

S: a variable indicating the total amount of slippage;
$N_{zec}$: a count indicating the number of times zero errors were found in the update data D2, since the number of actual errors left in the update data set D2 may fall to zero as the weights improve;
MaxZeroErrorCases: a predetermined maximum number of consecutive times zero errors are found remaining in the update data set D2. In one embodiment, this parameter is set to 3 to prevent excessive unnecessary iterations;
$w_{current}$: current set of logistic regression parameters; and
$w_{new}$: newly calculated logistic regression parameters.

As the process begins 402, the logistic regression model updating module 110 generates 404 the combined data set (D1) from the update data set (D2), and updates the logistic regression parameters according to steps 408-428 while $N_{iterations}$ is less than MaxIterations in step 406.

First, the logistic regression model updating module 110 computes 408 new logistic regression parameters $w_{i,new} = w_{current,i} + \Delta w_{1,i}$ based upon the combined data set (D1) according to the method described in FIG. 3. Then, it is determined 410 whether $\Delta L_1$ is less than $\epsilon$. If $\Delta L_1$ is less than $\epsilon$, then this means that the change to the logistic regression parameters suggested by the combined data set (D1) is very small and thus the process returns 428 the current logistic regression parameters $w_{current}$ without any updating, and the process ends 430.

If $\Delta L_1$ is not less than $\epsilon$, then it is further determined 412 whether $\Delta L_2$ is a positive number or zero. If $\Delta L_2$ is negative, indicating degradation of the quality of the model fit on the update data D2, the process increases 418 $N_{fails}$ by 1 and increases 418 the value of S by the value of $\Delta L_2$. If the $N_{fails}$ is equal to or exceeds MaxFails in step 420, the current logistic regression parameters $w_{current}$ are returned 428 without any updating and the process ends 430. If $N_{fails}$ does not exceeds MaxFails, it is further determined 422 whether S is larger than the kth largest value of $\Delta L_2$ stored in $HistoryL_2$. If S is equal to or larger than the kth largest $\Delta L_2$ stored in $HistoryL_2$, this means that $\Delta L_2$ is a large negative value and should be disregarded. Thus, the current logistic regression parameters $w_{current}$ are returned 428 without any updating, and the process ends 430. If S does not exceed the kth largest value of $\Delta L_2$ stored in $HistoryL_2$, then the current logistic regression parameters $w_{current}$ are updated 416 with $w_{new}$.

If $\Delta L_2$ is not less than zero in step 412, $N_{fails}$ and S are reset 414 to zero and $\Delta L_2$ is inserted 414 into $HistoryL_2$ if the value of $\Delta L_2$ exceeds the kth largest value of the previous $\Delta L_2$'s stored in $HistoryL_2$. Then, the current logistic regression parameters $w_{current}$ are updated 416 with $w_{new}$.

Also, if the number of errors made on the update data set (D2) is zero, $N_{zec}$ is increased 424 by 1. However, if the number of errors made on the update data set (D2) is not zero, then $N_{zec}$ is reset 424 to zero. The logistic regression model updating module 110 further determines 426 whether $N_{zec}$ is equal to or greater than MaxZeroErrorCases. If $N_{zec}$ is less than MaxZeroErrorCases, $N_{iterations}$ is increased 432 by 1 and the process returns to step 406. If $N_{zec}$ is equal to or greater than MaxZeroErrorCases, then the updated logistic regression parameters $w_{current}$ are returned 428 and the process ends 430.

The present invention has the advantage that logistic regression parameters are updated using the coherent gradient method, which is a modification of the conjugate gradient descent method (a popular member of the family of deflected gradient algorithms). That is, the changes to the logistic regression parameters are made only when the gradients suggested by the combined data set (D1) (and thus the previous data set (D3)) and the update data set (D2) agree in direction.

Therefore, the method of the present invention helps avoiding degradation of the performance of the logistic regression engine 106 on data that are older yet still important or significant.

Although the present invention has been described above with respect to several embodiments, various modifications can be made within the scope of the present invention. For example, the document classification system of the present invention may be used to classify any type of information, documents, emails, images, sounds, etc., using the logistic regression algorithm. The type of binary feature vector will depend upon the characteristics of what is to be filtered by the logistic regression algorithm. In addition, other methods may be used to determine whether the gradients suggested by the combined data set (D1) and the update data set (D2) agree in direction, in place of multiplying the two gradients.

Accordingly, the disclosure of the present invention is intended to be illustrative, but not limiting, of the scope of the invention, which is set forth in the following claims.

What is claimed is:

1. A computer system for classifying documents using a logistic regression algorithm, the computer system comprising:
   a computer readable storage medium storing computer instructions including:
      a logistic regression engine for applying the logistic regression algorithm to the documents to classify the documents; and
      a logistic regression model updating module for generating second logistic regression parameters updating first logistic regression parameters of the logistic regression algorithm, the first logistic regression parameters being generated based upon a first set of data, and the second logistic regression parameters being generated based upon a second set of data if the second set of data is coherent with a third set of data and the second logistic regression parameters not being generated based upon the second set of data if the second set of data is not coherent with the third set of data, the third set of data including external classifications of the documents and the second set of data including a combination of the first and the third sets of data, and wherein the second set of data is coherent with the third set of data if first and second changes to the first logistic regression parameters to generate the second logistic regression parameters, as indicated by the second and third sets of data, respectively, are consistent with each other, the logistic regression engine applying the logistic regression algorithm to the documents to classify the documents using the second logistic regression parameters if the second logistic regression parameters are generated based upon the second set of data and using the first logistic regression parameters if the second logistic regression parameters are not generated based upon the second set of data; and
   a processor for executing the computer instructions.

2. The computer system of claim 1, wherein the logistic regression model updating module calculates a set of first gradients and a set of second gradients of log likelihood of the second and third sets of data, respectively, and generates the second logistic regression parameters using selected first gradients that are coherent with the corresponding second gradients associated with a same feature representative of the documents.

3. The computer system of claim 2, wherein the logistic regression model updating module determines that the first gradient is coherent with the corresponding second gradient, responsive to a positive product of the first gradient and the corresponding second gradient.

4. The computer system of claim 2, wherein the logistic regression model updating module generates the second logistic regression parameters if the first gradient is not less than a predetermined threshold.

5. The computer system of claim 2, wherein the logistic regression model updating module generates the second logistic regression parameters if the second gradient is negative but not less than a kth largest value of previously calculated second gradients, where k is a predetermined number.

6. The computer system of claim 1, wherein the logistic regression engine classifies the documents into either a first category or a second category.

7. The computer system of claim 6, wherein the logistic regression engine determines probabilities of the documents being in the first category, and classifies the documents in the first category if the probabilities exceed a predetermined threshold.

8. The computer system of claim 6, wherein the documents are emails and the first and second categories are "spam" and "non-spam" emails, respectively.

9. The computer system of claim 1, wherein each of the documents is represented by the existence and non-existence of a plurality of features in the document.

10. The computer system of claim 1, wherein the external classifications of the documents include user classifications of the documents.

11. A computer-implemented method for generating second logistic regression parameters updating first logistic regression parameters of a logistic regression algorithm used in classifying documents, the first logistic regression parameters being generated based upon a first set of data and the second logistic regression parameters being generated based upon a second set of data, the computer-implemented method configured as computer instructions stored on a computer readable storage medium to cause a processor of a computer to execute the computer instructions, the computer-implemented method comprising:

receiving a third set of data, the third set of data including external classifications of the documents; and generating the second logistic regression parameters based upon the second set of data if the second set of data is coherent with the third set of data and not generating the second logistic regression parameters based upon the second set of data if the second set of data is not coherent with the third set of data, the second set of data including a combination of the first and the third sets of data, the first logistic regression parameters being generated based upon the first set of data, and wherein the second set of data is coherent with the third set of data if first and second changes to the first logistic regression parameters for generating the second logistic regression parameters, as indicated by the second and third sets of data, respectively, are consistent with each other, and the logistic regression algorithm being applied to the documents to classify the documents using the second logistic regression parameters if the second logistic regression parameters are generated based upon the second set of data and using the first logistic regression parameters if the second logistic regression parameters are not generated based upon the second set of data.

12. The computer-implemented method of claim 11, wherein generating the second logistic regression parameters comprises:

calculating a set of first gradients and a set of second gradients of log likelihood of the second and third sets of data, respectively; and generating the second logistic regression parameters using selected first gradients that are coherent with the corresponding second gradients associated with a same feature representative of the documents.

13. The computer-implemented method of claim 12, wherein the first gradients are determined to be coherent with the corresponding second gradients, responsive to a positive product of the first gradient and the corresponding second gradient.

14. The computer-implemented method of claim 12, wherein the second logistic regression parameters are generated if the first gradients are not less than a predetermined threshold.

15. The computer-implemented method of claim 12, wherein the second logistic regression parameters are generated if the second gradient is negative but not less than a kth largest value of previously calculated second gradients.

16. The computer-implemented method of claim 11, further comprising classifying the documents into either a first category or a second category.

17. The computer-implemented method of claim 16, wherein classifying the documents comprises:

determining probabilities of the documents being in the first category; and classifying the documents in the first category if the probabilities exceed a predetermined threshold.

18. The computer-implemented method of claim 16, wherein the documents are emails and the first and second categories are "spam" and "non-spam" emails, respectively.

19. The computer-implemented method of claim 11, wherein each of the documents is represented by the existence and non-existence of a plurality of features in the document.

20. The computer-implemented method of claim 11, wherein the external classifications of the documents include user classifications of the documents.

21. A computer readable storage medium storing a computer program product including computer instructions configured to cause a processor of a computer to perform a method for generating second logistic regression parameters updating first logistic regression parameters of a logistic regression algorithm used in classifying documents, the first logistic regression parameters being generated based upon a first set of data and the second logistic regression parameters being generated based upon a second set of data, the method comprising:

receiving a third set of data, the third set of data including external classifications of the documents; and generating the second logistic regression parameters based upon the second set of data if the second set of data is coherent with the third set of data and not generating the second logistic regression parameters based upon the second set of data if the second set of data is not coherent with the third set of data, the second set of data including a combination of the first and the third sets of data, the first logistic regression parameters being generated based upon the first set of data, and wherein the second set of data is coherent with the third set of data if first and second changes to the first logistic regression parameters for generating the second logistic regression parameters, as indicated by the second and third sets of data, respectively, are consistent with each other, and the logistic regression algorithm being applied to the documents to classify the documents using the second logistic regression parameters if the second logistic regression parameters are generated based upon the second set of data and using the first logistic regression parameters if the second logistic regression parameters are not generated based upon the second set of data.

22. The computer readable storage medium of claim 21, wherein generating the second logistic regression parameters comprises:
    calculating a set of first gradients and a set of second gradients of log likelihood of the second and third sets of data, respectively; and
    generating the second logistic regression parameters using selected first gradients that are coherent with the corresponding second gradients associated with a same feature representative of the documents.

23. The computer readable storage medium of claim 22, wherein the first gradients are determined to be coherent with the corresponding second gradients responsive to a positive product of the first gradient and the corresponding second gradient.

24. The computer readable storage medium of claim 22, wherein the second logistic regression parameters are generated if the first gradients are not less than a predetermined threshold.

25. The computer readable storage medium of claim 22, wherein the second logistic regression parameters are generated if the second gradient is negative but not less than a kth largest value of previously calculated second gradients.

26. The computer readable storage medium of claim 21, wherein the method further comprises classifying the documents into either a first category or a second category.

27. The computer readable storage medium of claim 26, wherein classifying the documents comprises:
    determining probabilities of the documents being in the first category; and
    classifying the documents in the first category if the probabilities exceed a predetermined threshold.

28. The computer readable storage medium of claim 26, wherein the documents are emails and the first and second categories are "spam" and "non-spam" emails, respectively.

29. The computer readable storage medium of claim 21, wherein each of the documents is represented by the existence and non-existence of a plurality of features in the document.

30. The computer readable storage medium of claim 21, wherein the external classifications of the documents include user classifications of the documents.

* * * * *